Patented May 9, 1933

1,907,440

UNITED STATES PATENT OFFICE

DONALD K. PATTILLO, OF DOVER-FOXCROFT, MAINE, ASSIGNOR TO CLINTON CORN SYRUP REFINING COMPANY, OF CLINTON, IOWA, A CORPORATION OF IOWA

PROCESS OF MAKING PAPER

No Drawing.    Application filed November 25, 1932.  Serial No. 644,269.

This invention relates to paper-making processes and especially to those processes which involve the addition to the paper stock or fibre-water mixture of amylaceous bonding material.

The invention is in the nature of an improvement on the paper-making process illustrated in a co-pending application, Serial No. 532,990, filed April 25, 1931 by myself, George E. Corson and Herbert L. Thompson.

The process described in said application consisted in adding the amylaceous bonding material continuously to the fibre-water mixture at a point between the beater and the paper-making machine, as distinguished from adding the amylaceous bonding material to the beater according to the usual practice.

It was found that where the amylaceous bonding material was added to the fibre-water flow subsequent to the beating operation, a very large proportion, often approximately 100%, of the bonding material is retained in the finished product while where the amylaceous bonding material is added in the beater the retention of bonding material in the finished product is only about 30% or 40% at the most.

The term "amylaceous bonding material" is used herein to indicate various starches, starch conversion products, dextrines, gums and oxidized starches or derivatives thereof.

While a very high retention of the amylaceous bonding material in the finished product is secured by the continuous addition of such bonding material subsequent to the beating operation but prior to the passing of the fibre-water mixture to the paper-making wire, yet experiments have shown that the effect on the finished paper produced by the presence of the amylaceous bonding material varies with the acid content of the fibre-water flow at the point where such bonding material is added.

The acid condition of a solution is sometimes expressed in terms of pH values and sometimes in terms of total acidity. The term "pH value" is one which is commonly used in the paper-making art to indicate the intensity of acidity or alkalinity of the fibre-water mixture. A pH value of 7 indicates a neutral condition of the fibre-water flow while a pH value less than 7 indicates an acid condition and a pH value greater than 7 indicates an alkaline condition. An increased acid condition in indicated by a decreased pH value. Thus a pH value of 5.0 represents a greater intensity of acidity than a pH value of 6.0.

The term "total acidity" as applied to fibre-water flow is used to indicate the total acid constituent of such fibre-water flow and one way of expressing the total acidity is in terms of the number of parts of some chemical which it is necessary to add to a million parts of the fibre-water mixture in order to render said mixture neutral. A familiar manner of expressing total acidity is in terms of calcium carbonate, that is, the number of parts of calcium carbonate necessary to add to a million parts of the mixture to neutralize the latter.

In the case of a chemically-pure solution any variation in the acid condition would produce approximately the same variation in both the pH value and the total acidity but in a fibre-water mixture to which chemicals have been added for one purpose or another and which contains more or less insoluble matter, a variation in the acid condition of the mixture does not necessarily produce the same variation in both the pH value and total acidity.

Experiments which have been conducted indicate that when amylaceous bonding material is added to the fibre-water mixture as above described, the degree to which the particles of amylaceous bonding material are chemically or physically incorporated in the fibres of the fibre-water mixture depend to a large extent upon the acid condition of such fibre-water mixture at the point where the amylaceous bonding material is added, and the present invention relates to controlling the acid condition of the fibre-water mixture at this point, whether expressed in terms of pH value or in terms of total acidity or both, so as to increase the bonding effect of the amylaceous bonding material in the paper.

Experiments show that the greatest degree of chemical or physical union of the bonding material and the cellulose fibre occurs when the fibre-water flow is maintained with a pH value of from 5.4 pH to 5.7 pH, but noticeable effects of chemical or physical union are secured within the pH range of from 5.0 pH to 6.0 pH. As the acid concentration in the fibre-water mixture decreases above 6.0 pH or increases below 5.0 pH the effects of the chemical or physical union of the bonding material with the cellulose fibre decreases or increases likewise. Hence by controlling the pH value of the fibre-water mixture at the point where the amylaceous bonding material is added it is possible to secure the desired chemical or physical union of the bonding material particles with the fibre.

Experiments further show that the degree of chemical or physical union of the amylaceous bonding material with the cellulose fibre is also affected by the total acidity of the fibre-water flow at the point where the bonding material is added. If the total acidity is below approximately 20 p. p. m. expressed in terms of calcium carbonate as described in "Standard Methods for the Examination of Water and Sewerage" Sixth Edition, published by American Public Health Association there will be a better physical or chemical union than if the total acidity is indicated by a value greater than approximately 20 p.p.m. A total acidity of 20 p. p. m. indicates that the acid condition is such that it would take twenty parts of calcium carbonate to neutralize a million parts of the fibre-water flow.

This control of the acid condition of the fibre-water mixture, whether expressed in terms of pH value or in terms of total acidity or both, can be secured by the addition of suitable chemicals to the fibre-water flow either prior to or simultaneously with the addition of the amylaceous bonding material. Preferably these chemicals should be added continuously through a suitable feeding device, the feed of the chemicals being regulated to maintain a constant desired pH value and a total acidity which will preferably be less than approximately 20 p. p. m. expressed in terms of calcium carbonate.

Any known chemical which will either increase or decrease the pH value or total acidity to bring them within the desired range may be used. Some chemicals of an alkaline nature suitable for reducing the total acidity or increasing the pH value are caustic soda, soda aluminate, soda ash, lime, etc., and an acid constituent which would increase the total acidity of the fibre-water flow or decrease the pH value is alum or some other acid salt.

Experiments have shown that the addition of the amylaceous bonding material particles by this new process effects great improvement in the retention secured. Such experiments also indicate that the nature of the gelatinized wall on the cellulose fibres varies with the different pH and/or total acidity conditions and that a variation in such conditions produces varying effects on the outside surface of the particles of amylaceous bonding material and also that with a total acidity of less than approximately 20 p. p. m. and a pH value of between 5.4 pH and 5.7 pH there is an increased physical or chemical combination or union of the gelatinized fibre wall and the amylaceous bonding material which has in effect the characteristic of an increased hydration of the cellulose fibre. The same retentions of the amylaceous bonding material and the same increased hydration effect is secured with a given pH value regardless of whether the process is in operation on an open, a closed, or a partially closed system.

This increased hydration or gelatinization may be due in part or in whole to the added gelatinizing effect of the amylaceous bonding material particle or may be due in part or in whole to the effect of this particle addition on the hydrated or gelatinized fibre but no distinction is made between an actual cellulose hydration and the combination of the chemical and cellulose hydrations and so this increased hydration effect is referred to as an apparent added hydration of the cellulose fibre.

In the operation of paper machines the speed of formation of the paper web is governed to a large extent by the hydration of the cellulose fibre. As the fibre becomes more hydrated more water is held by the fibre and the slower the fibre gives up its water in the process of forming the paper web. The addition of the amylaceous bonding material to the beater according to the known process in no way affects the operation on the paper machine in regards to the speed of formation of the paper web, but the addition of the amylaceous bonding material according to this invention under the optimum pH conditions above described so increases the apparent hydration of the fibre that it becomes necessary to either reduce the speed of the paper machine to permit an equal removal of water from the treated and untreated fibres, or to compensate for the above-described added hydration effect by reducing the hydration of the fibres in the beaters or Jordan by an amount approximately equal to the added hydration given to the fibres by the addition of amylaceous bonding material under optimum pH and/or total acidity conditions, thereby permitting the normal operation of the paper machine at normal speeds of paper web formation. Obviously, this compensation may be provided either by a reduction of the beating time of the cellulose fibre or the reduction of the work done by the Jordan engines. In either case there results a marked saving in power used in fibre preparation as compared with the normal power costs for hydrating fibre which has not been treated according to this invention.

As is well known certain characteristics of paper depend almost entirely upon the degree of fibre hydration it is obvious that by this process of addition of amylaceous bonding material under optimum pH and/or total acidity conditions by which added hydration effects are secured, and by proper mechanical adjustments of the paper machine to compensate for such added hydration effects on the fibre, a superior paper product can be produced. Furthermore, by regulating the mechanical hydration of the fibre in the beater or Jordan engines to compensate for the added hydration effect secured by the addition of amylaceous bonding material according to this invention, paper of equally as good characteristics as a normal paper can be produced with noteworthy savings in power consumed in fibre preparation.

Instead of reducing the power loadings on the Jordan or the time of fibre preparation in the beaters it is possible to substitute an inferior and less expensive fibre for the more expensive fibre used in the normal furnish for the reason that this added apparent hydration makes possible the production of a paper product with equal or better characteristics from inferior cellulose fibre than can be produced under present practice with more expensive raw material in the normal paper product.

This process is particularly adaptable to the manufacture of specialty papers wherein one or more characteristics of the finished product enhances the value of the paper for conversion uses. It is possible by this process to more or less control any or several of these paper characteristics to produce a superior sheet of paper for a particular purpose.

By means of the improvement herein described desired increase in the physical strength characteristics of the paper product can be obtained by regulating the pH and/or total acidity values to the optimum conditions, and under these optimum conditions such strength increases are in definite relationship to the amount of amylaceous bonding material added. It is obvious that by this process it is possible to evolve paper products that are not possible under present day practices. For example, the addition of amylaceous bonding material particles by this new process and under optimum pH and/or total acidity conditions produces a sheet of bag paper having an increased bursting strength of approximately thirty (30) per cent, a decreased elongation of approximately thirty (30) per cent and a closer formation with the same or lower porosity, which characteristics contribute largely to the quality of bag paper. Further in making glassine paper the addition of approximately four (4) per cent of amylaceous bonding material by this new process, and at a pH value of the fibre-water mixture of 5.6 pH and a total acidity of 10 p. p. m. produces a sheet of glassine paper with approximately a thirty (30) per cent increase in bursting strength, an approximate two hundred (200) per cent increase in sizing value, an increase of approximately twenty (20) per cent in transparency, an increased folding endurance, an improved surface finish due to the closer formation of the paper web which is due to the increased hydration of the fibres comprising it and a noticeable blistering as compared to a sheet of glassine paper produced by the addition of the same amount of the same type of amylaceous bonding material to the beater according to known methods and with the same pH and total acidity values of the fibre-water mixture on the paper machine. Under known paper-making methods it is not considered practical or possible to effect such changes in paper products as can be brought about by the effect of amylaceous bonding material particles in controlled amounts and under controlled pH and total acidity conditions by the improved process above described.

In the manufacture of paper products on multi-cylinder machines, the adhesion of the various plies or cylinder sheets is of great importance. In the known process of paper making, this ply adhesion is controlled more or less by the control of the hydration of the cellulose fibres making up the different cylinder sheets. It is obvious, therefore, that such adhesion will vary with different fibres used and in many cases ply adhesion so controlled is very unsatisfactory.

The present improved process greatly increases ply adhesion on multi-cylinder machines, because with the greatly increased retention of the amylaceous bonding material particles and with the induced chemical hydration of the cellulose fibres comprising the cylinder sheets, the top and bottom surfaces of each cylinder sheet have in effect a layer of gelatinized bonding particles which adhere to adjacent layers of the paper web from adjoining cylinders to effect a greatly increased bonding strength between the different cylinder sheets. Experiments show that there is a migration of the bonding particles and the bonding particles combined with the shorter cellulose fibres to the outer sheet surfaces and these migrating particles further increase ply adhesion by their becoming cemented together by the action of the higher temperatures in the paper drying operation and by subsequent compression of the paper in passing through the calender stacks.

The addition of the amylaceous bonding material under optimum pH and/or total acidity conditions and by the methods of this invention effects marked increase in the speed of drying the paper formed by this process. For example, in the manufacture of match board on the multi-cylinder machine, the normal speed of machine operation is thirty-eight (38) feet per minute, and at this speed and with the steam pressures of thirty-five (35) pounds in the drying cylinders the board produced shows a moisture content of six (6) per cent. With identical machine and dryer conditions but with the addition of three (3) per cent of amylaceous bonding material to the fibre-water mixture at a pH value of 5.4 pH, in accordance with this invention, the board produced showed a moisture content of one and one-half (1½) per cent. It was found possible, therefore, to increase the machine speed to fifty (50) feet per minute and yet maintain the normal moisture content in the treated board at the same value as the moisture content of the treated board made by present methods.

With this accelerated drying speed the paper board made in accordance with this invention has all of the characteristics attributable to a board made of a more hydrated stock. The bursting strength is increased up to forty (40) per cent, the ply adhesion is markedly increased, the board formation is more uniform, the surface finish is better, and the board is much stiffer and better sized than the normal. This result is apparently different from that obtained by known paper-making methods for according to this invention the more hydrated stock on the wet end of the paper machine is reflected directly in paper strength in the finished product and other attributes of a more hydrated stock, and yet there is a marked increased in the speed of the paper drying.

While the theories governing this phenomenon are somewhat in doubt, it is believed that the increased drying speed is attributable to the changed formation of the paper board made by this improved process which permits the extraction of more water mechanically in the press rolls or permits a more rapid evolution of steam from the board on the drying cylinders. It is possible that this increased speed of drying may be attributable to the chemical or physical union of the amylaceous bonding material with the cellulose fibre under optimum pH and total acidity conditions and it is further possible that the action of the amylaceous bonding material on the shorter fibres of the furnish may so change the structure of the shorter fibres as to permit a more rapid rate of drying. This accelerated rate of drying effected by the addition of amylaceous bonding material under optimum pH and total acidity conditions permits either the operation of the machine at a higher rate of speed to give the same moisture content in the finished paper product or permits the use of less steam on the drying cylinders resulting in noteworthy economies in drying costs. The addition of amylaceous bonding material to the beater or by any of the known methods generally practiced does not in any way effect an increase in drying speed nor does such addition increase in any way the strength factors of the paper product made.

Experiments show that the variation in pH and total acidity conditions of the fibre-water mixture at the time of addition of the amylaceous bonding material does not affect noticeably the actual retention of the amylaceous bonding material in the finished product. So far as actual retention of the amylaceous bonding material is concerned the governing factor when the addition is made in accordance with this invention is that the particles of bonding material are not diminuted by the beating operation as is the case where the amylaceous bonding material is added in the beater according to the known method. Where the bonding material is thus added in the beater the amount of retention in the finished product varies with the degree of particle diminution of bonding material caused by the beater action and also with the condition of the cellulose fibre at the time of addition.

While the actual amount of retention of amylaceous bonding material does not vary appreciably with variations in pH and total acidity conditions of the fibre-water mixture, yet the effect produced by the retention of the bonding material does vary with the pH and total acidity conditions. While the theory governing this phenomena is not entirely clear yet it is believed that within the optimum range of from 5.0 pH to 6.0 pH and a total acidity of less than 20 p. p. m. expressed in terms of calcium carbonate both the gelatinized film on the cellulose fibre wall and the particle of amylaceous bonding material undergo some change and that at an optimum condition within the specified range a physical or chemical union of the fibre and the amylaceous bonding material particle takes place to produce the marked effects described above.

This physical chemical union may proceed to completion or it may be partial reaction so that the effects produced may be in part due to change of the fibre and the amylaceous bonding material particle at a definite pH and total acidity condition, and may in part be due to the physical or chemical union of the fibre with the bonding material particle.

In the paper-making art alum is added to the beater, sometimes for the purpose of precipitating the rosin size on the paper fibre and sometimes for the purpose of setting the color, if a colored paper is being made, and sometimes for both purposes. For this purpose it has been found to be desirable to add to the beater an excessive amount of alum over that which would theoretically be required for precipitating the amount of size and/or color which has been added to the beater, and as a result the fibre-water flow coming from the beater contains an excess of alum thereby giving the fibre-water flow a total acidity greater than a pH value less than that which produces the best effects when the amylaceous bonding material is added. Under these conditions the present invention contemplates adding to the fibre-water flow after it comes from the beater a sufficient amount of an alkaline chemical to reduce the total acidity of the fibre-water flow below 20 p. p. m. and to increase its pH value to the optimum.

The addition of such alkaline chemical not only results in bringing the acid condition of the fibre-water flow to the desired point but it also reacts on the excess of alum in the fibre-water flow causing aluminum hydroxide to be precipitated on the fibres of the fibre-water flow. This aluminum hydroxide is in itself a bonding material so that when amylaceous bonding material is added and becomes effective the fibres will be bonded or cemented together both by the action of the amylaceous bonding material and by that of the aluminum hydroxide.

The optimum pH and total acidity conditions for this process vary with different paper mills for the reason that different mills have different water supplies and different types of water, varying cellulose raw materials which may be acid or alkaline in nature and various types of process flow which may exert some influence on the effects produced. The optimum point of pH operation, however, can readily be determined for specific conditions and that once established it should not vary. The range from 5.0 pH to 6.0 pH has been found to give the most marked results, but the variation is not limited to this range as it is probable that in some instances noteworthy results could be effected at pH values below 5.0 pH and above 6.0 pH.

Furthermore, while experiments have shown that a total acidity not exceeding approximately 20 p. p. m. expressed in terms of calcium carbonate give the best results yet the invention is not limited to these exact values as the important thing is that the total acidity as well as the pH value should be controlled and maintained at the point which gives the desired results in the paper product.

I claim:

1. The process of making paper which consists in adding amylaceous bonding material continuously to the fibre-water flow between the beater and the paper-making machine and maintaining a substantially constant pH value of the fibre-water flow at the point where the amylaceous bonding material is added.

2. The process of making paper which consists in adding amylaceous bonding material continuously to the fibre-water mixture between the beater and the paper-making machine and maintaining a substantially constant degree of acidity in the fibre-water flow at the point where the amylaceous bonding material is added.

3. The process of making paper which consists in adding amylaceous bonding material continuously to the fibre-water mixture between the beater and the paper-making machine and maintaining the fibre-water flow at a pH value of between 5.0 pH and 6.0 pH at the point where the amylaceous bonding material is added.

4. The steps in the process of making paper which consist in adding amylaceous bonding material continuously to the fibre-water mixture between the beater and the paper-making machine and maintaining a total acidity of said mixture below approximately 20 p. p. m. as expressed in terms of calcium carbonate at the point where the bonding material is added.

5. The steps in the process of making paper which consist in adding amylaceous bonding material continuously to the fibre-water mixture between the beater and the paper-making machine and maintaining the fibre-water mixture at the point where the bonding material is added at a substantially constant pH value and with a total acidity not exceeding approximately 20 p. p. m. as expressed in terms of calcium carbonate.

6. The steps in the process of making paper which consist in adding amylaceous bonding material continuously to the fibre-water mixture between the beater and the paper-making machine and maintaining said fibre-water mixture at the point where the amylaceous bonding material is added at a pH value of between 5.0 pH and 6.0 pH and with a total acidity not exceeding approximately 20 p. p. m. as expressed in terms of calcium carbonate.

7. That improvement in the process of making paper from a furnish containing rosin size in which an excess of alum is added to the beater to ensure the precipitation of the size on the fibres, characterized in that an alkaline material is continuously added to the fibre-water mixture between the beater and the paper-making machine in sufficient quantity to reduce the acid condition of the fibre-water mixture to a pH value of not less than 5.0 pH, and then adding amylaceous bonding material to said fibre-water mixture.

8. That improvement in the process of making paper from a furnish containing rosin size in which an excess of alum is added to the beater to ensure the precipitation of the size on the fibres, characterized in that an alkaline material is continuously added to the fibre-water mixture between the beater and the paper-making machine in sufficient quantity to reduce the acid condition of the fibre-water mixture to a pH value of not less than 5.0 pH and to a total acidity value not greater than 20 p. p. m. as expressed in terms of calcium carbonate and subsequently adding amylaceous bonding material to the fibre-water mixture having such reduced acid condition.

In testimony whereof, I have signed my name to this specification.

DONALD K. PATTILLO.